US010458453B1

(12) United States Patent
Galligan et al.

(10) Patent No.: US 10,458,453 B1
(45) Date of Patent: Oct. 29, 2019

(54) DOWEL BAR ASSEMBLY AND MECHANICAL CONNECTOR

(71) Applicant: Construction Materials, Inc., Cedar Rapids, IA (US)

(72) Inventors: Richard Galligan, Cedar Rapids, IA (US); Duane A. Jaeb, Wyoming, MN (US)

(73) Assignee: Construction Materials, Inc., Cedar Rapids, IA (US)

( * ) Notice: Subject to any disclaimer, the term of this patent is extended or adjusted under 35 U.S.C. 154(b) by 381 days.

(21) Appl. No.: 15/226,596

(22) Filed: Aug. 2, 2016

Related U.S. Application Data

(62) Division of application No. 14/045,215, filed on Oct. 3, 2013, now Pat. No. 9,541,111.

(60) Provisional application No. 61/781,403, filed on Mar. 14, 2013, provisional application No. 61/709,393, filed on Oct. 4, 2012.

(51) Int. Cl.
*F16B 9/02* (2006.01)
*E04B 1/68* (2006.01)

(52) U.S. Cl.
CPC .......... *F16B 9/023* (2013.01); *E04B 1/6807* (2013.01)

(58) Field of Classification Search
None
See application file for complete search history.

(56) References Cited

U.S. PATENT DOCUMENTS

| 2,269,703 | A | * | 1/1942 | Bagwill | E01C 11/14 404/60 |
| 4,127,921 | A | | 12/1978 | Townsend | |
| 6,092,960 | A | * | 7/2000 | McCallion | E01C 11/14 404/62 |
| 6,447,203 | B1 | * | 9/2002 | Ruiz | E01C 11/14 404/134 |
| 7,314,334 | B1 | | 1/2008 | Bennett et al. | |
| 7,404,691 | B2 | | 7/2008 | Bennett et al. | |
| 2008/0085155 | A1 | | 4/2008 | Bennett et al. | |

\* cited by examiner

*Primary Examiner* — Jonathan P Masinick
(74) *Attorney, Agent, or Firm* — Shuttleworth & Ingersoll, PLC; Brett Papendick

(57) ABSTRACT

A mechanical connector for securing a dowel rod to a frame of a dowel bar assembly as well as a dowel bar assembly are detailed. Each embodiment of the mechanical connector includes a portion to receive the dowel bar. A second portion of the mechanical connector engages the frame of the dowel bar assembly. A third portion of the mechanical connector engages a separate part of the frame further stabilizing the mechanical connector and frame.

4 Claims, 14 Drawing Sheets

DOWEL BAR ASSEMBLY AND MECHANICAL CONNECTOR

CROSS-REFERENCE TO RELATED APPLICATIONS

The present application is a division of patent application Ser. No. 14/045,215 which was filed on Oct. 3, 2013 and claims priority to provisional patent application 61/709,393 which was filed on Oct. 4, 2012, and also claims priority to provisional patent application 61/781,403 which was filed on Mar. 14, 2013, all of which are hereby expressly incorporated by reference in their entirety.

BACKGROUND

Dowel bar assemblies are used at both expansion and contraction type joints in concrete slabs. The function of both types of joints is to control random cracking of the concrete slab. The concrete slabs vary in thickness, width and length but are typically designed for commercial, industrial and roadway uses. The function of the dowel bar assembly at the joint locations is to position the dowel at the mid-point of the slab or at half the thickness of the slab off of the grade. The dowel itself is used to control the misalignment of adjacent slab areas in both vertical and horizontal directions. As the slabs move in fractional amounts due to temperature and other dynamic forces, the dowels maintain the position of the concrete slabs.

Present dowel bar assemblies are manufactured using a fusion process or welding method to make fixed connections between wire frame components and between the wire frame and the dowel. The assembly process varies widely and ranges from very manual methods to highly automated methods of assembly. In all cases, the connection between the wire support frame and the dowel is a welded connection. This is typically also the case when utilizing tie bars instead of dowel bars.

Tie bar assemblies are very similar in design to dowel bar assemblies but are used at joints that will not allow movement. Tie bar assemblies are manufactured in the same way as dowel bar assemblies, however, the tie bar has a deformed surface rather than the smooth surface of a dowel bar.

In cases where corrosion protection is used on the dowels, the welding process damages the protective coating due to the high temperatures at the weld location. Additionally, manual and automatic welding processes lead to weld impurities which in turn lead to broken welds and displaced dowels. Additionally, due to the rigid nature of the welded connection, vibrations during transporting of the assemblies can result in broken welds. In addition to traditional dowel, certain dowels are made of fiberglass while others are hollow synthetic tubes that are filled with materials such as cementious grout. These types of dowels do not allow for their use in a welding application.

The typical welding process for manufacturing dowel bar assemblies exposes labor forces to unhealthy working conditions. Automatic production methods can alleviate the exposure to such conditions, however, large amounts of smoke are generated due to the high temperatures of the welding process. With the burning of protective coatings used on the dowel bar assemblies during the welding process, the exposure to unhealthy conditions is only magnified.

It is an object of the invention to provide a mechanical connection for a dowel bar assembly or tie bar assembly.

It is a further object of the invention to provide a mechanical connection for a dowel bar assembly or tie bar assembly which reduces exposure to harmful chemicals.

It is yet another object of the invention to provide a mechanical connection for a tie bar or dowel bar assembly of various substances.

SUMMARY OF THE INVENTION

A mechanical connection for a dowel bar assembly as well as a dowel bar assembly containing a mechanical connection are presented. The mechanical connection or connecting device connects a dowel and a frame of the dowel bar assembly and can be one of three embodiments. It is to be understood that a tie bar could be substituted for the dowel bar in the invention.

The first embodiment is a friction type connector and is the preferred embodiment. The first embodiment is preferably made of a plastic and contains a cavity capable of receiving a dowel bar. A receiving member secures a first portion of the frame of the dowel bar assembly. Typically this is the "A-frame" portion of a dowel bar assembly. Additionally, the device includes a lip which provides further stabilization and support for the dowel bar assembly. Additional features such as a complimentary curved groove on the top and the bottom of the embodiment allow the device to be stacked upon one another.

A second embodiment achieves similar results to the first embodiment but is in the form of a clip design. The clip has a planar member with arms which serve to form a recess similar to the cavity of the first embodiment and serves to receive a dowel bar. A groove in a second arm engages the A-frame of a dowel bar assembly similar to the receiving member of the first embodiment. A flange on the first arm engages a second portion of the dowel bar assembly and further stabilizes the connection between the dowel bar and the remainder of the dowel bar assembly.

A third embodiment utilizes a metal structure in the form of a spring coil wire to secure a dowel rod to a remainder of a dowel bar assembly. At least one circular member forms a cavity for receiving the dowel bar. The connecting device has an arm which follows the dowel bar in one direction and then turns in a second direction before terminating in an end. The end then partially wraps around a first portion of a frame of the dowel bar assembly. The arm also abuts a second portion of the frame whereby the force exerted on the second portion and the first portion hold the dowel bar and frame in place.

A fourth embodiment utilizes a spring steel compression ring with a spring steel clip. The clip is similar to the second embodiment but instead utilizes a ring to lock the clip in place around the dowel.

It is to be understood that the embodiments described above can be placed on dowel bars and a wire frame to create dowel bar assemblies. Either one mechanical connection device can be utilized on only one side of the dowel bar or two mechanical connection devices can be utilized, one on each side of the dowel bar. Furthermore, when utilized in the field, several dowel bar assemblies are joined in a parallel formation. Depending on the specific circumstances and requirements, none, some or all of the dowel bar assemblies can have one mechanical connection device while the remaining dowel bar assemblies can have two mechanical connection devices.

DETAILED DESCRIPTION

Figure 1:
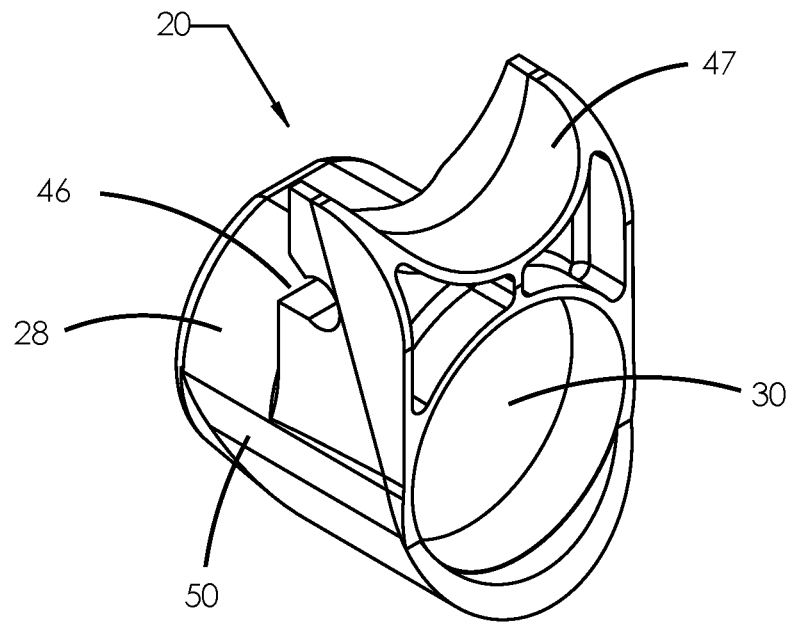
FIG. 1 is a perspective view of a first embodiment of the mechanical connection.
Figure 2:
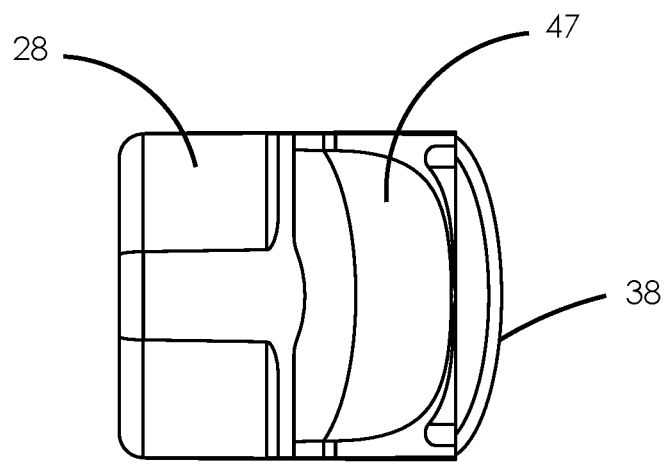
FIG. 2 is a bottom view of the first embodiment.
Figure 4:
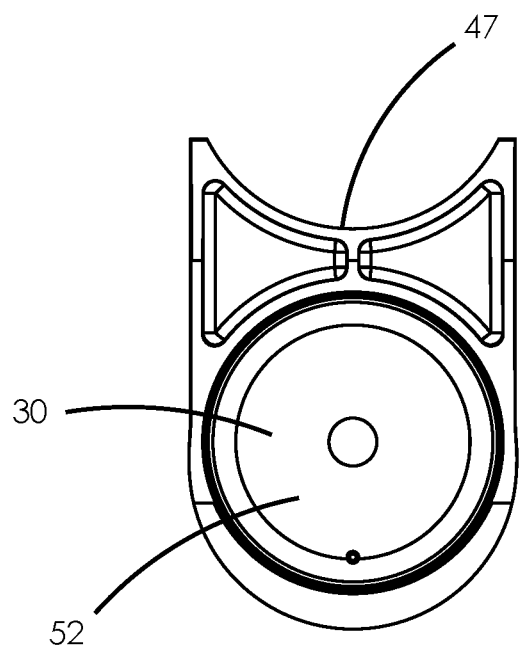
FIG. 4 is a front view of the first embodiment.
Figure 5:
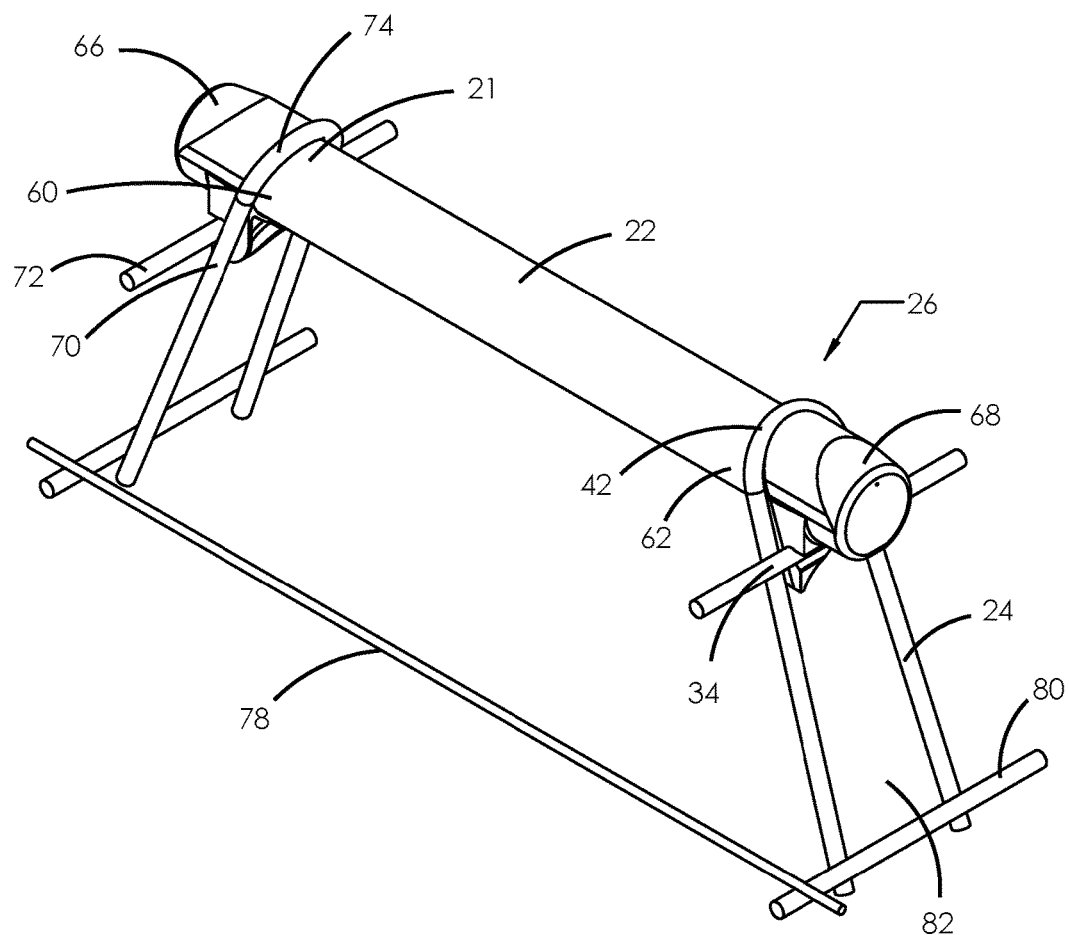
FIG. 5 is a perspective view of the first embodiment of the mechanical connection on a dowel bar assembly.
Figure 6:
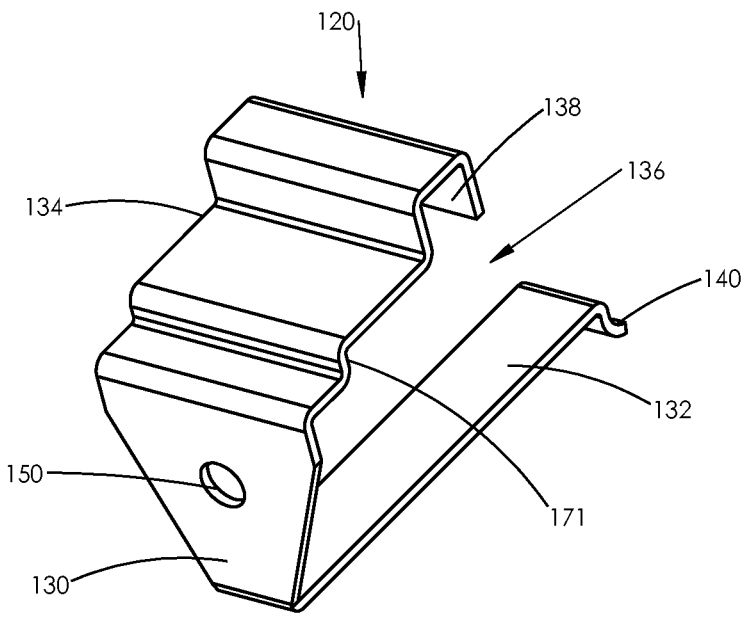
FIG. 6 is a perspective view of a second embodiment of the mechanical connection.
Figure 7:
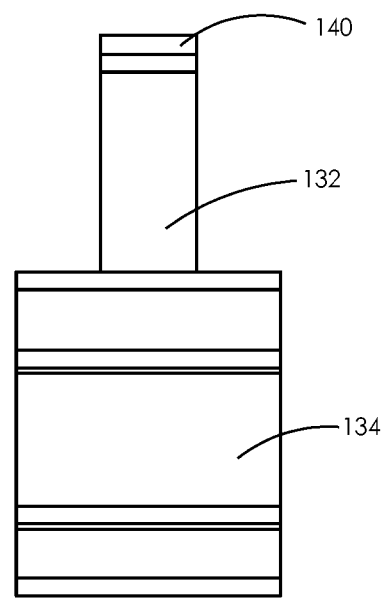
FIG. 7 is a top view of the second embodiment.
Figure 8:
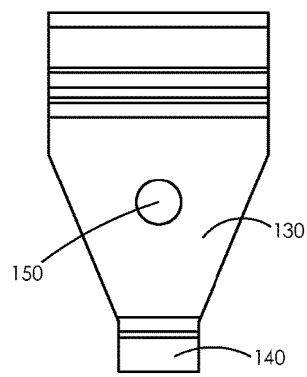
FIG. 8 is a front view of the second embodiment.
Figure 9:
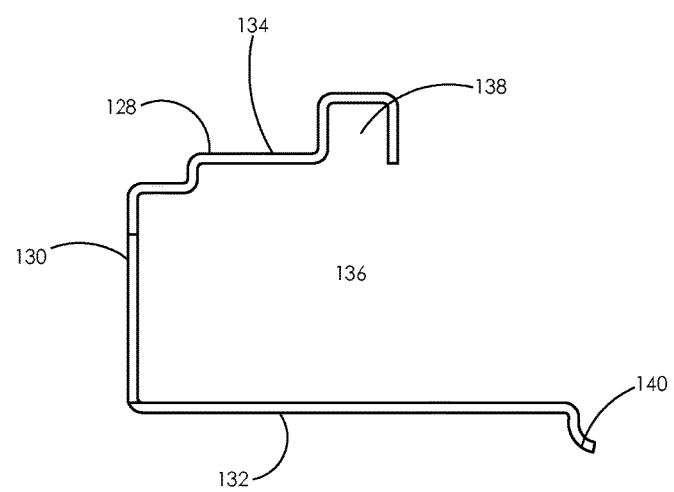
FIG. 9 is side view of the second embodiment.

Now referring to the drawings, FIG. 1 shows a first embodiment of a connecting device 20 which connects a dowel bar 22 (see FIG. 5) and a frame 24 (see FIG. 5) of a dowel bar assembly 26 (see FIG. 5). The device depicted in FIGS. 1-4 is also the preferred embodiment disclosed in the specification and drawings. The device 20 comprises a housing member 28 which has a cavity 30. The cavity 30 is formed to be a shape so that it can receive an end 21 of the dowel bar 22. As a typical dowel bar is rounded and/or cylindrical, the cavity of the preferred embodiment corresponds to a rounded and/or a cylindrical shape, however, the cavity 30 and the housing member 28 can be a variety of shapes to accommodate different shaped dowel bars.

Figure 3:
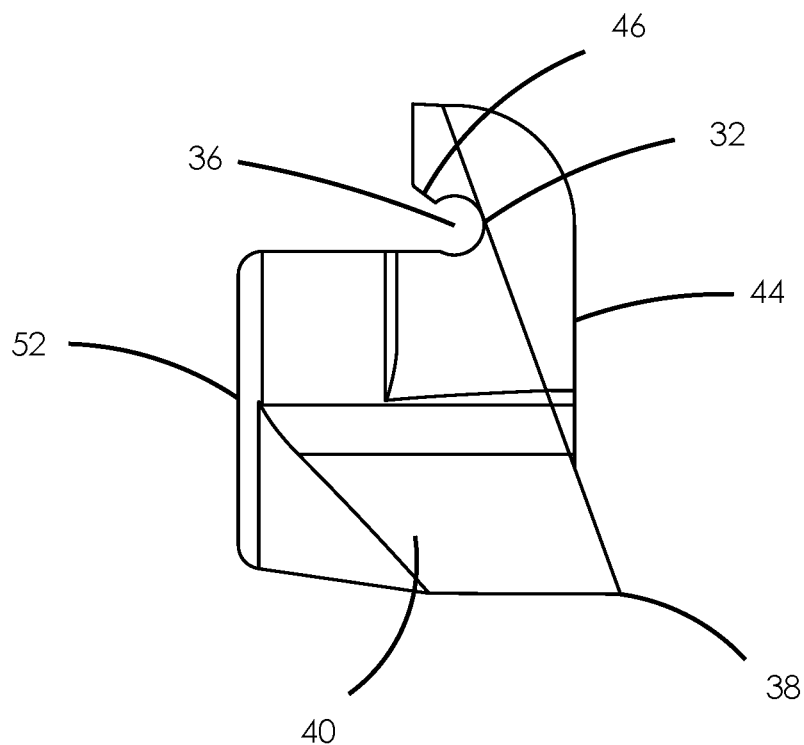
FIG. 3 is a side view of the first embodiment.

FIG. 3 shows a receiving member 32 capable of receiving a first portion 34 of the frame 24 shown in FIG. 5. Again, as the first portion 34 of the frame 24 is typically round and made of metal, the receiving member 32 is preferably a cylindrical shaped slot 36 which corresponds to the rounded first portion 34. The shape of the slot 36 and receiving member 32 can be varied based on the shape of the frame 24. The receiving member further comprises a guide channel 46 which tapers toward the cylindrical shaped slot 36 which assists in placing the first portion 34 within the slot 36.

Again referring to FIG. 3, the device 20 comprises a lip 38 which extends a distance passed a main body 40 of the housing member 28. The lip 38 also extends at an angle toward a mid point of the housing member 28. The lip 38 blends into an outer edge 44 of the housing member 28 preferably at an angle. When the device 20 is utilized in association with the dowel bar assembly 26, a second portion 42 of the frame 24 is positioned on the dowel bar 22 and makes contact with the lip 38 and at least a portion of the outer edge 44.

The device 20 further comprises a groove 47 which is preferably curved and corresponds to the shape of the dowel bar 22 and/or a wall 50 of the device 20. The shape of the groove 47 allows multiple dowel bar assemblies 26 and/or connecting devices 20 to be stacked vertically upon one another. A back wall 52 as seen in FIG. 4 serves as a stop to assist in the positioning of the dowel bar 22 and also assists in maintaining the position of the dowel bar 22 in relation to the overall dowel bar assembly 26 of FIG. 5.

Again referring to FIG. 5, a complete dowel bar assembly 26 is detailed. The dowel bar 22 comprises a first end 60 and a second end 62. The first end 60 is inserted into a first connecting device 66 and the second end 62 is inserted into a second connecting device 68. The frame 24 comprises two symmetrical A-frames 70 each comprising a cross member 72 and a U-shaped member 74. The U-shaped member 74 is preferably shaped to correspond to the shape of the dowel bar 22. Additionally, the U-shaped member 74 comprises the second portion 42 which abuts the lip 38 and at least a portion of the outer edge 44.

The cross member 72 is fitted into the receiving member 32 via the guide channel 46 and into the slot 36. Preferably, the cross member 72 is snapped into place within the slot 36 and held firmly in place. The devices 66 and 68 are still preferably selectively removable from the dowel bar 22 and the A-frames 70. The A-frames 70 can be connected to one another via at least one base member 78. A second cross member 80 can be utilized to span an open end 82 of the U-shaped member 74.

Each connecting device 66 and 68 hold the dowel bar 22 and frame 24 in place through a friction type connection wherein the lip 38, the receiving member 32 and the walls forming the cavity 30 exert forces which maintain the connection between the frame 24 and dowel bar 22. It is to be understood that the cross member 80 can be attached to additional dowel bar assemblies to create a row or column of dowel bar assemblies.

Figure 10:
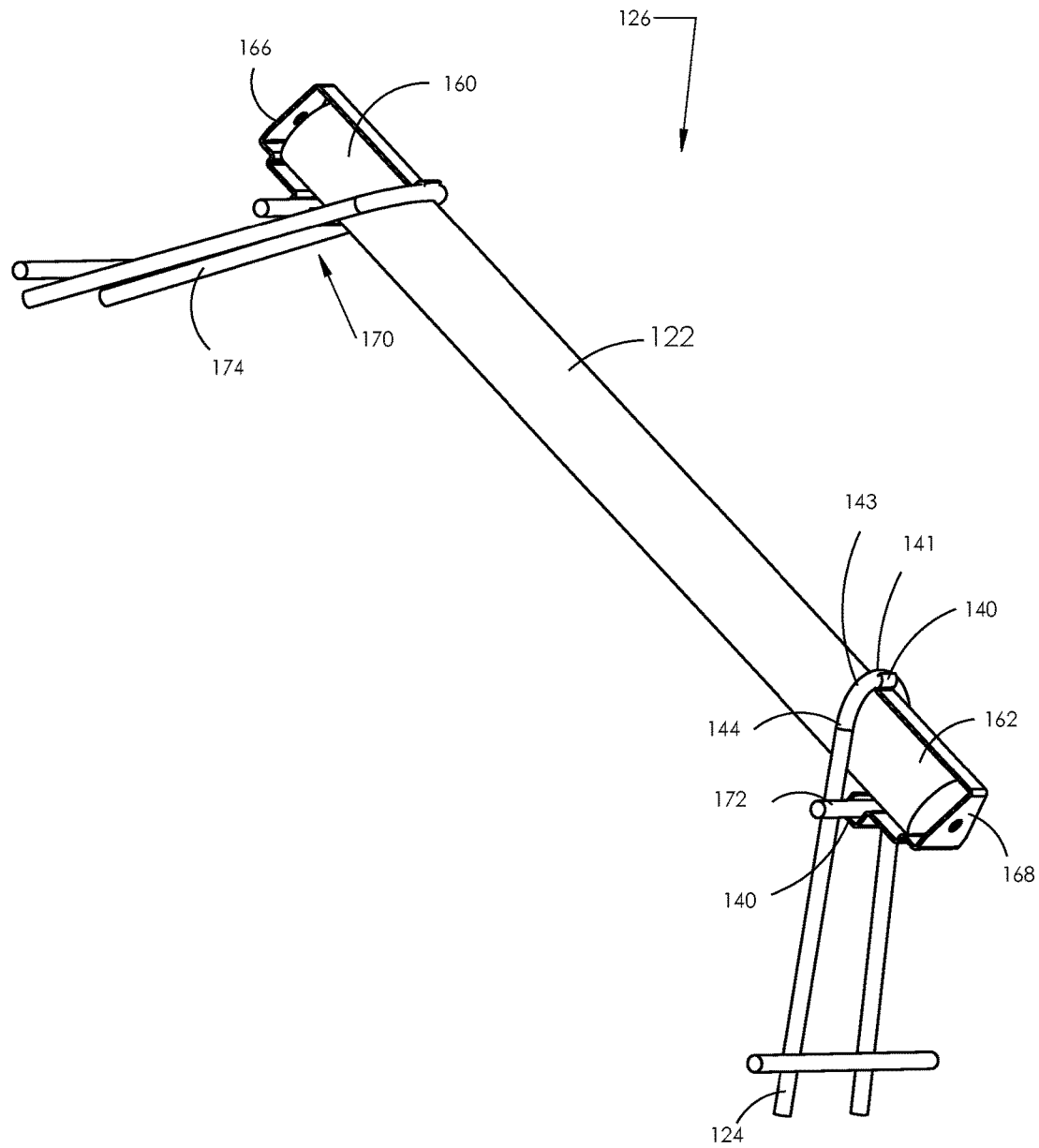
FIG. 10 is a perspective view of the second embodiment of the mechanical connection on a dowel bar assembly.
Figure 11:
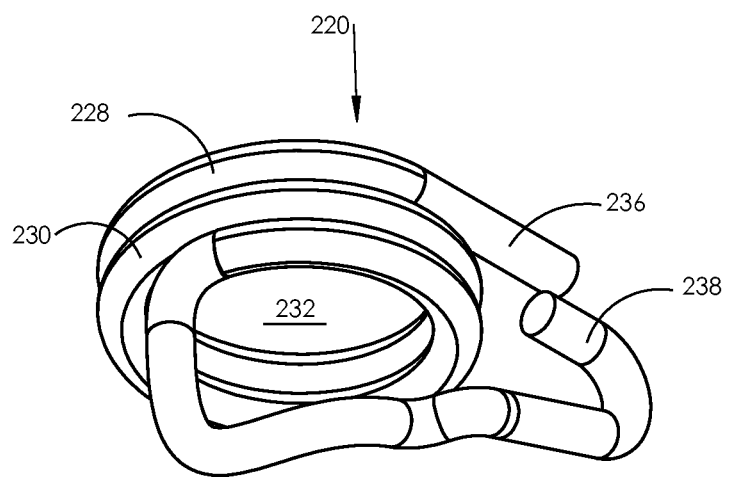
FIG. 11 is a perspective view of a third embodiment of the mechanical connector.
Figure 12:
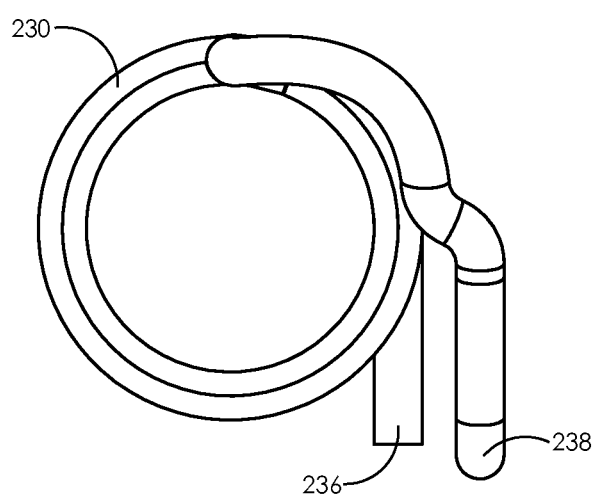
FIG. 12 is a front view of the third embodiment.
Figure 13:
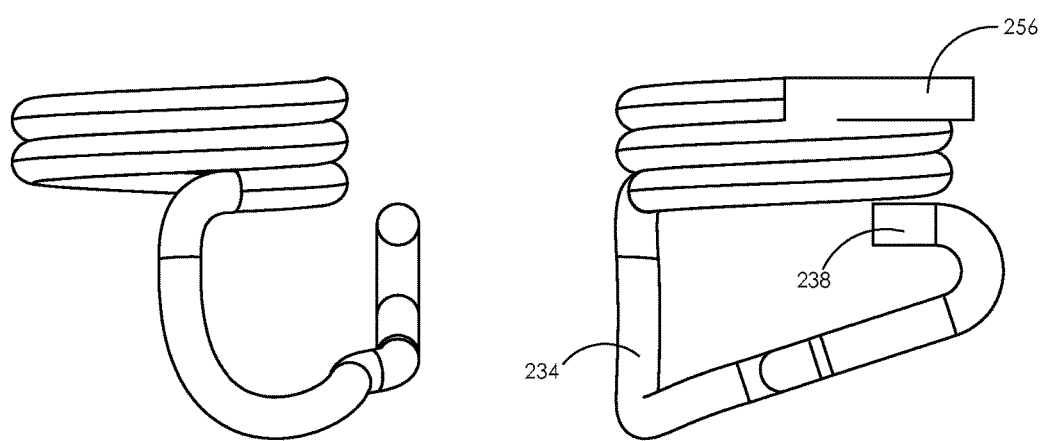
FIG. 13 is a side view of the third embodiment.

FIGS. 6-10 show a second embodiment of a connecting device 120 which is also a mechanical connection for a dowel bar 122 (see FIG. 10) and frame 124 (see FIG. 10) of a dowel bar assembly 126 (see FIG. 10). The device 120 comprises a clip 128. The clip 128 comprises a planar member 130, a first arm 132 and a second arm 134. The planar member 130, first arm 132 and second arm 134 form a cavity 136 capable of receiving the dowel bar 122.

The first arm 132 preferably extends substantially perpendicular to the planar member 130. The second arm 134 also preferably extends substantially perpendicular to the planar member 130. However, the second arm 134 comprises a series of platforms resembling stairs that serve functional purposes. The second arm 134 further comprises a groove 138 that engages and secures a first portion 140 of the frame 124 which corresponds to a cross member 172 of an A-frame 170. The first arm 132 comprises a flange 140 which engages a second portion 141 of the frame 124. The second portion 141 is an apex 143 of the A-frame 170. The planar member 130 comprises a hole 150 which can be utilized for an inlet for a screw or other fastening device to further secure the device 120 to the dowel bar 122.

As seen in FIG. 10, the clip 128 of the second embodiment of the connecting device utilizes different structures to accomplish a similar function of the first embodiment of the connecting device. Again referring to FIG. 10, a complete dowel bar assembly 126 is detailed. The dowel bar 122 comprises a first end 160 and a second end 162. The first end 160 is inserted into a first connecting device 166 and the second end 162 is inserted into a second connecting device 168. The frame 124 comprises two symmetrical A-frames 170 each comprising a cross member 172 and a U-shaped member 174. The U-shaped member 174 is preferably shaped to correspond to the shape of the dowel bar 122. Additionally, the U-shaped member 174 comprises the second portion 141 which abuts the flange 140.

The cross member 172 is fitted into the groove 138 which can be performed by manually bending the second arm 134 away from the dowel bar 122. A band (not shown) can placed around the clip 128 and dowel bar 122 to further secure the frame 124 in the groove 138 and prevent slipping of the frame 124 out of the groove 138. The devices 166 and 168 are still preferably selectively removable from the dowel bar 122 and the A-frames 170. The A-frames 170 are connected to one another via at least one base member 178. A second cross member 180 can be utilized to span an open end 182 of the U-shaped member 174.

Each connecting device 166 and 168 hold the dowel bar 122 and frame 124 in place through a friction type connection wherein the groove 138, the flange 140 and the structures defining the cavity 30 exert forces which maintain the connection between the frame 124 and dowel bar 122. For additional support of the connection, a screw (not shown) or other attachment mechanism can be inserted into the hole 150 and attached to the ends 160, 162 of the dowel bar 122. Furthermore, a first edge 171 of the second arm 134 abuts the first end 160 a distance from the planar member 130.

Figure 14:
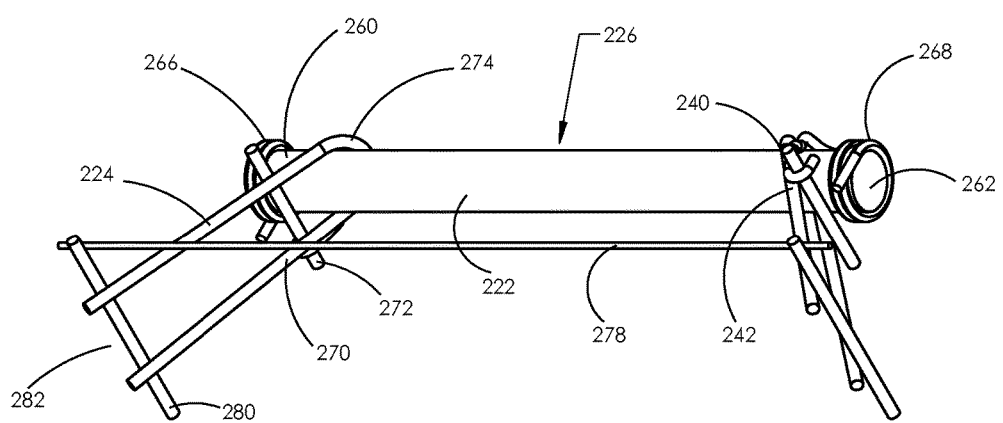
FIG. 14 is a perspective view of the third embodiment of the mechanical connection on a dowel bar assembly.

The third embodiment of a connecting device 220 is shown in FIGS. 11-14 which is also a mechanical connection for a dowel bar 222 and frame 224 of a dowel bar assembly 226 (see FIG. 14). The device 220 comprises a spring coil wire 228. The spring coil wire 228 comprises at least one circular member 230 forming a cavity 232 which is capable of receiving the dowel bar 222. The spring coil wire 228 further comprising an arm 234 extending in a first direction parallel to the dowel bar 222. The arm 234 then extends in a second direction substantially downward.

The arm 234 has a first end 236 and a second end 238 wherein the second end 238 engages a first portion 240 of the frame 224. The arm 234 abuts or engages a second portion 242 of the frame 224. The first end 236 and second end 238 can be manually moved to manipulate the spring coil wire 228 such that the spring coil wire can be selectively removed from the dowel bar 222 and frame 224.

As seen in FIG. 14, the spring coil wire 230 of the third embodiment of the connecting device utilizes different structures to accomplish a similar function of the first embodiment of the connecting device. Again referring to FIG. 14, a complete dowel bar assembly 226 is detailed. The dowel bar 222 comprises a first end 260 and a second end 262. The first end 260 is inserted into a first connecting device 266 and the second end 262 is inserted into a second connecting device 268. The frame 224 comprises two symmetrical A-frames 270 each comprising a cross member 272 and a U-shaped member 274. The U-shaped member 274 is preferably shaped to correspond to the shape of the dowel bar 222. Additionally, the U-shaped member 274 comprises the second portion 242 which abuts the arm 234.

The second end 238 is manipulated around the cross member 272 by manually bending the second end 238 under and around the cross member 272. The A-frames 270 are connected to one another via at least one base member 278. A second cross member 280 can be utilized to span an open end 282 of the U-shaped member 274. Once attached the frictional forces of the arm 234 abutting the second portion 242 and the second end 238 wrapping at least a portion around the cross member 272 and the at least one circular members abutting the dowel bar 222 maintain the dowel bar 222 and the frame 224 in a fixed position.

A fourth embodiment shown in FIGS. 15-21 is of a connecting device 320 which is also a mechanical connection for a dowel bar 322 and frame 324 of a dowel bar assembly 326. The device 320 comprises a clip 328. The clip 328 comprises a planar member 330, a first arm 332 and a second arm 334. The planar member 330, first arm 332 and second arm 334 form a cavity 336 capable of receiving the dowel bar 322.

The first arm 332 preferably extends substantially perpendicular to the planar member 330. The second arm 334 also preferably extends substantially perpendicular to the planar member 330. The second arm 334 further comprises a groove 338 that engages and secures a first portion 343 of the frame 324 which corresponds to a cross member 372 of an A-frame 370. The first arm 332 comprises a second groove 340 which engages a second portion 341 of the frame 324. The second portion 341 is an apex 345 of the A-frame 370. Once the clip 328 is inserted over the dowel bar 322, a retaining ring 350 is slid over the clip 328 to lock the clip 328 in place.

Figure 15:
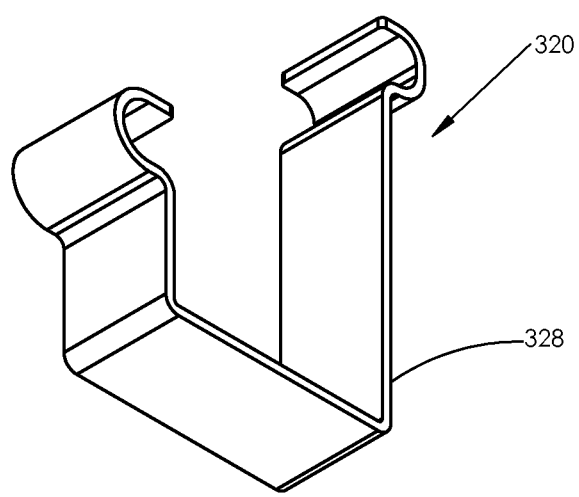
FIG. 15 is a perspective view of the fourth embodiment of the mechanical connection on a dowel bar assembly.
Figure 17:
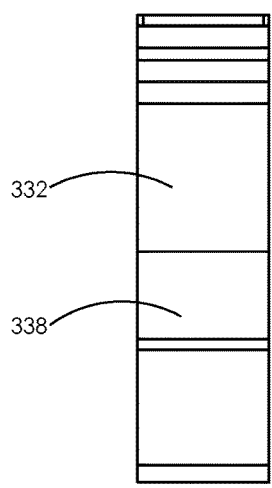
FIG. 17 is a front view of the fourth embodiment.
Figure 16:
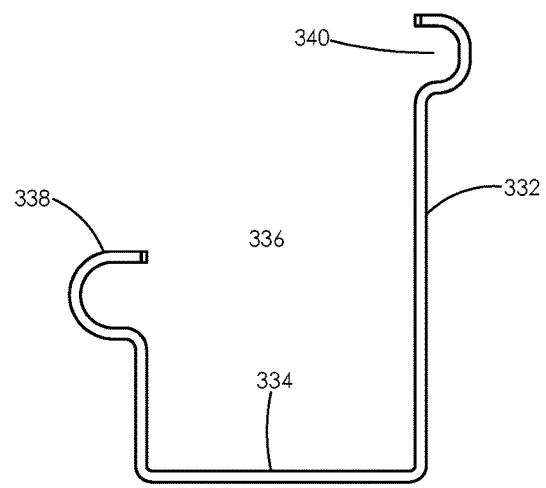
FIG. 16 is a side view of the fourth embodiment.
Figure 18:
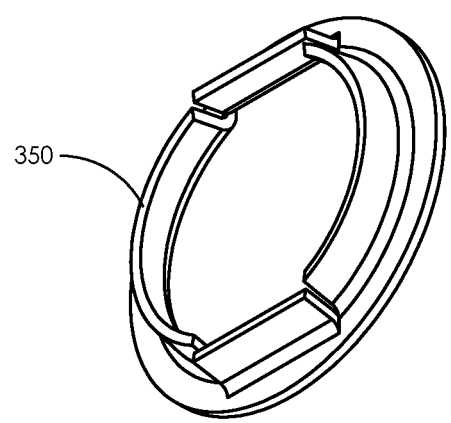
FIG. 18 is a perspective view of a retainer ring used in conjunction with the fourth embodiment.
Figure 19:
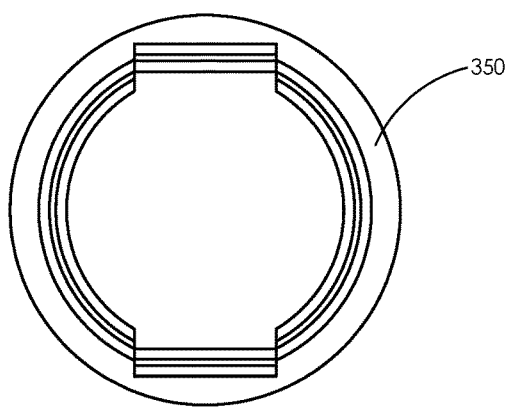
FIG. 19 is a front view of the ring.
Figure 20:
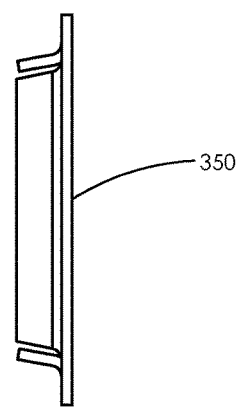
FIG. 20 is a side view of the ring.
Figure 21:
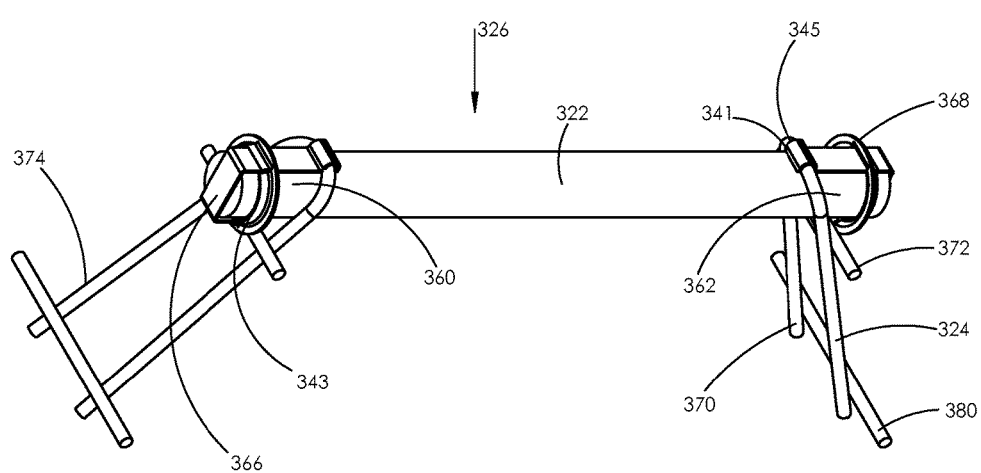
FIG. 21 is a perspective view of the fourth embodiment with the retainer ring attached.

As seen in FIG. 15, the clip 328 utilizes different structures to accomplish a similar function of the first embodiment of the connecting device. Additionally, the fourth embodiment is similar to the second embodiment, but instead uses the retaining ring 350 and does not utilize a screw for further securing the device to the dowel bar and frame. Again referring to FIG. 15, a complete dowel bar assembly 326 is detailed. The dowel bar 322 comprises a first end 360 and a second end 362. The first end 360 is inserted into a first connecting device 366 and the second end 362 is inserted into a second connecting device 368. The frame 324 comprises two symmetrical A-frames 370 each comprising a cross member 372 and a U-shaped member 374. The U-shaped member 374 is preferably shaped to correspond to the shape of the dowel bar 322. Additionally, the U-shaped member 374 comprises the second portion 341.

The cross member 372 is fitted into the groove 338 which can be performed by manually bending the second arm 134 away from the dowel bar 122. A band 350 is placed around the clip 328 and dowel bar 322 to further secure the frame 324 in the groove 338 and prevent slipping of the frame 324 out of the groove 338. The devices 366 and 368 are still preferably selectively removable from the dowel bar 322 and the A-frames 370. The A-frames 370 can be connected to one another via at least one base member 378. A second cross member 380 can be utilized to span an open end 382 of the U-shaped member 374.

Each connecting device 366 and 368 hold the dowel bar 322 and frame 324 in place through a friction type connection wherein the grooves 338 and 340 and the structures defining the cavity 336 exert forces which maintain the connection between the frame 324 and dowel bar 322. For additional support of the connection, the band 350 is selectively slidable over the clip 328.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A connecting device for a dowel bar and frame wherein the frame includes a U-shaped portion over the dowel bar and the frame has a horizontal cross-member, the connecting device comprising:
   a housing member;
   the housing member having a cavity;
   wherein the cavity is capable of receiving the dowel bar;
   the connecting device further comprising a receiving member,
   wherein the receiving member is capable of securing a first portion of the frame;
   whereby the dowel bar and the frame are held in place;
   a lip;
   the lip on an outer edge of the connecting device;
   the lip having an outer edge;
   a second portion of the frame makes contact with the outer edge and the dowel bar;
   the receiving member is located on a front of the device;
   wherein the front faces away from a longitudinal axis of the dowel bar;
   the outer edge on an opposite side of the receiving member.

2. The connecting device of claim 1, further comprising:
   a groove;
   the groove corresponding to a shape of a top of the connecting device;
   the groove on a bottom of the connecting device;
   wherein the groove allows multiple connecting devices to be stacked on top of one another;
   the receiving member is located between the groove and the main body.

3. The connecting device of claim 2, wherein
   the receiving member comprises a slot;
   the slot having an end in a shape corresponding to the first portion of the frame;
   the slot further comprising at least one guide channel allowing the first portion of the frame to be positioned into the slot.

4. The connecting device of claim 3; wherein:
   a shape of the cavity corresponds to an exterior of the dowel bar.

* * * * *